(12) United States Patent
Alawieh et al.

(10) Patent No.: US 12,413,931 B2
(45) Date of Patent: Sep. 9, 2025

(54) METHOD AND SYSTEM FOR OPTIMIZING THE POSITION OF A USER EQUIPMENT

(71) Applicant: Fraunhofer-Gesellschaft zur Förderung der angewandten Forschung e.V., Munich (DE)

(72) Inventors: Mohammad Alawieh, Erlangen (DE); Birendra Ghimire, Erlangen (DE); Bastian Perner, Erlangen (DE); Sebastian Kram, Erlangen (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 453 days.

(21) Appl. No.: 17/634,770

(22) PCT Filed: Aug. 11, 2020

(86) PCT No.: PCT/EP2020/072489
§ 371 (c)(1),
(2) Date: Feb. 11, 2022

(87) PCT Pub. No.: WO2021/028430
PCT Pub. Date: Feb. 18, 2021

(65) Prior Publication Data
US 2022/0286812 A1 Sep. 8, 2022

(30) Foreign Application Priority Data
Aug. 14, 2019 (EP) .................................... 19191646

(51) Int. Cl.
*H04W 4/029* (2018.01)
*G01S 5/02* (2010.01)
(Continued)

(52) U.S. Cl.
CPC ........... *H04W 4/029* (2018.02); *G01S 5/0284* (2013.01); *H04W 4/023* (2013.01); *H04W 24/08* (2013.01); *H04W 24/10* (2013.01); *H04W 84/04* (2013.01)

(58) Field of Classification Search
None
See application file for complete search history.

(56) References Cited

U.S. PATENT DOCUMENTS 9,354,324 B2 * 5/2016 Wu ........................ G01S 19/46
2017/0074989 A1 * 3/2017 Van Diggelen ...... G01C 21/165
2020/0021946 A1 * 1/2020 Kumar ................ H04W 72/541

FOREIGN PATENT DOCUMENTS

EP         2534902         8/2011
WO    WO-2011099909 A1 *  8/2011  ........... G01S 5/0263

OTHER PUBLICATIONS

International Preliminary Report on Patentability, Nov. 26, 2021, International Preliminary Examining Authority, European Patent Office, Application No. PCT/EP2020/072489.
(Continued)

*Primary Examiner* — Adolf Dsouza
(74) *Attorney, Agent, or Firm* — Burr & Forman LLP; Nathaniel T. Quirk, Esq.

(57) ABSTRACT

The disclosure describes a method for a network entity (NE) to optimize positioning of a user equipment (UE) based on static circumstances and situational/environmental circumstances. The static circumstances may be sensor capabilities and sensor quality related to the UE, radio access network (RAN) capabilities, or general system limitations. The NE may request a quality report from a measurement unit (MU) that indicates the positioning technologies used for such quality reporting. The NE may inform the MU which sensors and technologies to use for monitoring and request a report from these sensors and technologies. The NE may
(Continued)

receive results from measurements performed by the MU, and the NE may receive a message including the MU quality report in order to enable the NE to decide on the best positioning method for the UE in the current situation for the indicated sensors and technologies to perform the position calculation.

15 Claims, 5 Drawing Sheets

(51) Int. Cl.
  *H04W 4/02* (2018.01)
  *H04W 24/08* (2009.01)
  *H04W 24/10* (2009.01)
  *H04W 84/04* (2009.01)

(56) References Cited

OTHER PUBLICATIONS

3GPP TSG RAN WGI Meeting 94bis—Chengdu, Chona, Oct. 8-12, 2018—R1-1811459—Overview of Potential NR Positioning Technologies, Fraunhofer IIS.
3GPP TSG RAN WG2 Berlin, Germany, Aug. 21-25, 2017, R2-1709560—Basic Positioning Support in Release 15 for NR, Nokia, Nokia Shanghai Bell.

* cited by examiner

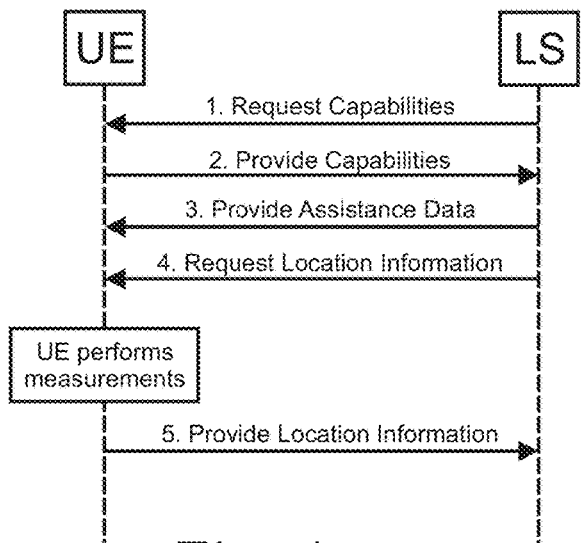

Fig. 1. (State of the art)

```
-- ASN1START
LPP-MessageBody ::= CHOICE {
    c1                              CHOICE {
        requestCapabilities             RequestCapabilities,
        provideCapabilities             ProvideCapabilities,
        requestAssistanceData           RequestAssistanceData,
        provideAssistanceData           ProvideAssistanceData,
        requestLocationInformation      RequestLocationInformation,
        provideLocationInformation      ProvideLocationInformation  ,
        abort                           Abort,
        error                           Error,
        spare7 NULL, spare6  NULL, spare5 NULL, spare4 NULL,
        spare3 NULL, spare2 NULL, spare1 NULL, spare0 NULL
    },
    messageClassExtension   SEQUENCE {}
}
-- ASN1STOP
```

Fig. 2. (State of the art)

```
-- ASN1START
RequestLocationInformation ::= SEQUENCE {
    criticalExtensions          CHOICE {
        c1                          CHOICE {
            requestLocationInformation-r9   RequestLocationInformation-r9-IEs,
            spare3 NULL, spare2 NULL, spare1 NULL
        },
        criticalExtensionsFuture    SEQUENCE {}
    }
}
RequestLocationInformation-r9-IEs ::= SEQUENCE {
    commonIEsRequestLocationInformation     CommonIEsRequestLocationInformation     OPTIONAL,  -- Need ON
    a-gnss-RequestLocationInformation       A-GNSS-RequestLocationInformation       OPTIONAL,  -- Need ON
    otdoa-RequestLocationInformation        OTDOA-RequestLocationInformation        OPTIONAL,  -- Need ON
    ecid-RequestLocationInformation         ECID-RequestLocationInformation         OPTIONAL,  -- Need ON
    epdu-RequestLocationInformation         EPDU-Sequence                           OPTIONAL,  -- Need ON
    ...,
    [[
    sensor-RequestLocationInformation-r13
                                Sensor-RequestLocationInformation-r13
                                                                                    OPTIONAL,  -- Need ON
    tbs-RequestLocationInformation-r13      TBS-RequestLocationInformation-r13      OPTIONAL,  -- Need ON
    wlan-RequestLocationInformation-r13     WLAN-RequestLocationInformation-r13     OPTIONAL,  -- Need ON
    bt-RequestLocationInformation-r13       BT-RequestLocationInformation-r13       OPTIONAL   -- Need ON
    ]]
}
-- ASN1STOP
```

Fig. 3. (State of the art)

```
-- ASN1START
RequestLocationQuality ::= SEQUENCE {
    commonIEsRequestLocationQuality     CommonIEsRequestLocationQuality    OPTIONAL,
    a-gnss-RequestLocationQuality       A-GNSS-RequestLocationQuality      OPTIONAL,
    otdoa-RequestLocationQuality        OTDOA-RequestLocationQuality       OPTIONAL,
    ecid-RequestLocationQuality         ECID-RequestLocationQuality        OPTIONAL,
    sensor-RequestLocationQuality       Sensor-RequestLocationQuality      OPTIONAL,
    tbs-RequestLocationQuality          TBS-RequestLocationQuality         OPTIONAL,
    wlan-RequestLocationQuality         WLAN-RequestLocationQuality        OPTIONAL,
    bt-RequestLocationQuality           BT-RequestLocationQuality          OPTIONAL,
    ...,
}
}
ProvideLocationQuality  -r16-IEs ::= SEQUENCE {
    commonIEsProvideLocationQuality     CommonIEsProvideLocationQuality    OPTIONAL,
    a-gnss-ProvideLocationQuality       A-GNSS-ProvideLocationQuality      OPTIONAL,
    otdoa-ProvideLocationQuality        OTDOA-ProvideLocationQuality       OPTIONAL,
    ecid-ProvideLocationQuality         ECID-ProvideLocationQuality        OPTIONAL,
    sensor-ProvideLocationQuality       Sensor-ProvideLocationQuality      OPTIONAL,
    tbs-ProvideLocationQuality          TBS-ProvideLocationQuality         OPTIONAL,
    wlan-ProvideLocationQuality         WLAN-ProvideLocationQuality        OPTIONAL,
    bt-ProvideLocationQuality           BT-ProvideLocationQuality          OPTIONAL,
    ...,
}
-- ASN1STOP
```

*Fig. 6.*

```
-- ASN1START
OTDOA-ProvideLocationQuality ::= SEQUENCE {
    otdoaStaticMeasurements        OTDOA-StaticMeasurements         OPTIONAL,
    otdoaStaticQuality             INTEGER (0..99)                  OPTIONAL,
    otdoaStaticLifetime            INTEGER (0..65535)               OPTIONAL,
    otdoaSituationalMeasurements   OTDOA-SituationalMeasurements    OPTIONAL,
    otdoaSituational Quality       INTEGER (0..99)                  OPTIONAL,
    otdoaSituationalLifetime       INTEGER (0..65535)               OPTIONAL
}
-- ASN1STOP
```

*Fig. 7.*

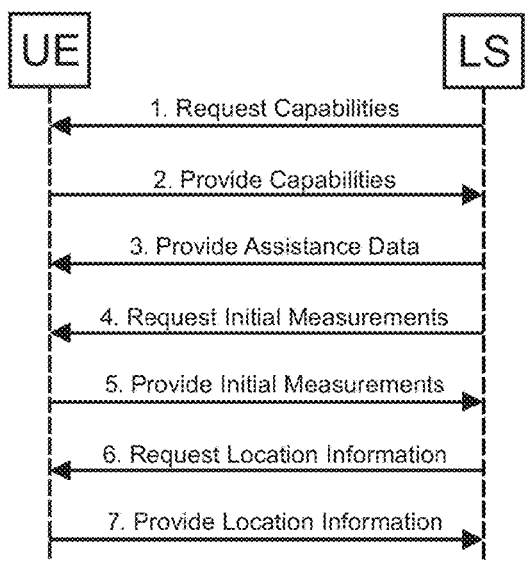

*Fig. 8a.*

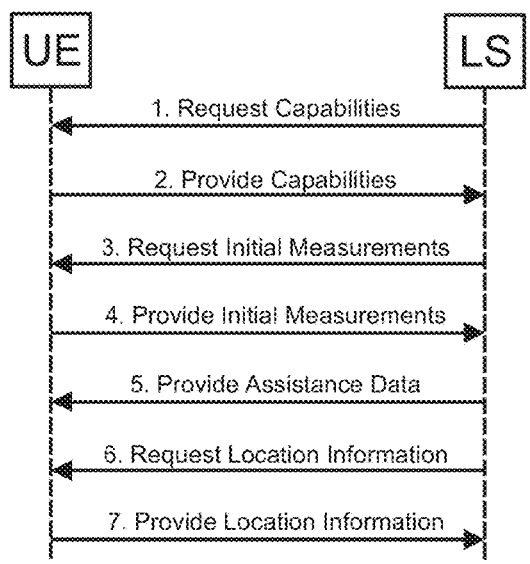

*Fig. 8b.*

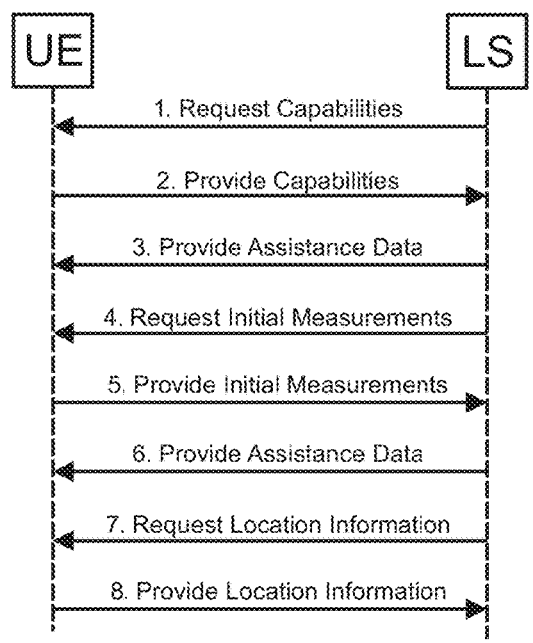

*Fig. 8c.*

```
-- ASN1START

LPP-MessageBody ::= CHOICE {
    c1                              CHOICE {
        requestCapabilities             RequestCapabilities,
        provideCapabilities             ProvideCapabilities,
        requestInitialMeasurements      RequestInitialMeasurements ,
        provideInitialMeasurements      ProvideInitialMeasurements ,
        requestAssistanceData           RequestAssistanceData,
        provideAssistanceData           ProvideAssistanceData ,
        requestLocationInformation      RequestLocationInformation,
        provideLocationInformation      ProvideLocationInformation ,
        abort                           Abort,
        error                           Error,
        spare7 NULL, spare6 NULL, spare5 NULL, spare4 NULL,
        spare3 NULL, spare2 NULL, spare1 NULL, spare0 NULL
    },
    messageClassExtension   SEQUENCE {}
}

-- ASN1STOP
```

*Fig. 9.*

```
-- ASN1START

RequestLocationInformation ::= SEQUENCE {
    criticalExtensions              CHOICE {
        c1                              CHOICE {
            requestLocationInformation -r9   RequestLocationInformation -r9-IEs,
            requestLocationQuality -r16      RequestLocationQuality -r16-IEs
            spare3 NULL, spare2 NULL, spare1 NULL
        },
        criticalExtensionsFuture        SEQUENCE {}
    }
}

RequestLocationInformation -r9-IEs ::= SEQUENCE {
    commonIEsRequestLocationInformation
                                    CommonIEsRequestLocationInformation   OPTIONAL,  -- Need ON
    a-gnss-RequestLocationInformation  A-GNSS-RequestLocationInformation  OPTIONAL,  -- Need ON
    otdoa-RequestLocationInformation   OTDOA-RequestLocationInformation   OPTIONAL,  -- Need ON
    ecid-RequestLocationInformation    ECID-RequestLocationInformation    OPTIONAL,  -- Need ON
    epdu-RequestLocationInformation    EPDU-Sequence                      OPTIONAL,  -- Need ON
    ...,
    [[
    sensor-RequestLocationInformation -r13
                                    Sensor-RequestLocationInformation -r13
                                                                          OPTIONAL,  -- Need ON
    tbs-RequestLocationInformation -r13  TBS-RequestLocationInformation -r13  OPTIONAL,  -- Need ON
    wlan-RequestLocationInformation -r13 WLAN-RequestLocationInformation -r13 OPTIONAL,  -- Need ON
    bt-RequestLocationInformation -r13   BT-RequestLocationInformation -r13   OPTIONAL,  -- Need ON
    ]]
}

RequestLocationQuality -r16-IEs ::= SEQUENCE {
    commonIEsRequestLocationQuality    CommonIEsRequestLocationQuality    OPTIONAL,  -- Need ON
    a-gnss-RequestLocationQuality      A-GNSS-RequestLocationQuality      OPTIONAL,  -- Need ON
    otdoa-RequestLocationQuality       OTDOA-RequestLocationQuality       OPTIONAL,  -- Need ON
    ecid-RequestLocationQuality        ECID-RequestLocationQuality        OPTIONAL,  -- Need ON
    epdu-RequestLocationQuality        EPDU-Sequence                      OPTIONAL,  -- Need ON
    sensor-RequestLocationQuality      Sensor-RequestLocationQuality      OPTIONAL,  -- Need ON
    tbs-RequestLocationQuality         TBS-RequestLocationQuality         OPTIONAL,  -- Need ON
    wlan-RequestLocationQuality        WLAN-RequestLocationQuality        OPTIONAL,  -- Need ON
    bt-RequestLocationQuality          BT-RequestLocationQuality          OPTIONAL,  -- Need ON
    ...
}

-- ASN1STOP
```

Fig. 10.

```
-- ASN1START

ProvideLocationInformation ::= SEQUENCE {
    criticalExtensions              CHOICE {
        c1                              CHOICE {
            provideLocationInformation -r9   ProvideLocationInformation -r9-IEs,
            provideLocationQuality -r16      ProvideLocationQuality -r16-IEs,
            spare3 NULL, spare2 NULL, spare1 NULL
        },
        criticalExtensionsFuture        SEQUENCE {}
    }
}

ProvideLocationInformation -r9-IEs ::= SEQUENCE {
    commonIEsProvideLocationInformation    CommonIEsProvideLocationInformation    OPTIONAL,
    a-gnss-ProvideLocationInformation      A-GNSS-ProvideLocationInformation      OPTIONAL,
    otdoa-ProvideLocationInformation       OTDOA-ProvideLocationInformation       OPTIONAL,
    ecid-ProvideLocationInformation        ECID-ProvideLocationInformation        OPTIONAL,
    epdu-ProvideLocationInformation        EPDU-Sequence                          OPTIONAL,
    ...,
    [[
    sensor-ProvideLocationInformation -r13    Sensor-ProvideLocationInformation -r13    OPTIONAL,
    tbs-ProvideLocationInformation -r13       TBS-ProvideLocationInformation -r13       OPTIONAL,
    wlan-ProvideLocationInformation -r13      WLAN-ProvideLocationInformation -r13      OPTIONAL,
    bt-ProvideLocationInformation -r13        BT-ProvideLocationInformation -r13        OPTIONAL
    ]]
}

ProvideLocationQuality -r16-IEs ::= SEQUENCE {
    commonIEsProvideLocationQuality    CommonIEsProvideLocationQuality    OPTIONAL,  -- Need ON
    a-gnss-ProvideLocationQuality      A-GNSS-ProvideLocationQuality      OPTIONAL,  -- Need ON
    otdoa-ProvideLocationQuality       OTDOA-ProvideLocationQuality       OPTIONAL,  -- Need ON
    ecid-ProvideLocationQuality        ECID-ProvideLocationQuality        OPTIONAL,  -- Need ON
    epdu-ProvideLocationQuality        EPDU-Sequence                      OPTIONAL,  -- Need ON
    sensor-ProvideLocationQuality      Sensor-ProvideLocationQuality      OPTIONAL,  -- Need ON
    tbs-ProvideLocationQuality         TBS-ProvideLocationQuality         OPTIONAL,  -- Need ON
    wlan-ProvideLocationQuality        WLAN-ProvideLocationQuality        OPTIONAL,  -- Need ON
    bt-ProvideLocationQuality          BT-ProvideLocationQuality          OPTIONAL,  -- Need ON
    ...
}

-- ASN1STOP
```

Fig. 11.

METHOD AND SYSTEM FOR OPTIMIZING THE POSITION OF A USER EQUIPMENT

CROSS-REFERENCE TO RELATED APPLICATION

This application is a national stage application, filed under 35 U.S.C. § 371, of International Patent Application No. PCT/EP2020/072489 filed on Aug. 11, 2020 and, European Patent Application No. 19191646.9 filed Aug. 14, 2019, which are incorporated by reference herein in their entirety.

FIELD OF INVENTION

The present invention relates to a method for a network entity, NE, to optimize the positioning of a user equipment, UE.

BACKGROUND ART

In an overview of relevant interfaces for positioning it can be mentioned that the current LTE positioning protocol, LPP, does not enable identifying the optimum technology or set of measurements to be performed or reported by the target device or UE. The location server, LS, requests the location information based on the UE capabilities and the information available at the network.

The information at the network can be for example if techniques like OTDOA, UTDOA or eCID are supported by the LS.

The LPP message body according to standard TS 36.355 includes all the LPP information as shown in FIG. 1 illustrating an LLP Procedure, and FIG. 2 illustrating an LLP message body. The LS request the location information from the UE as shown in FIG. 3, illustrating Request location information, where it can be seen that the LS requests the location information for one or more technologies (OTDOA, eCID, A-GNSS, WLAN, . . . ).

It is also known that the LPPa function allows the eNB to exchange location information with the E-SMLC for the purpose of E-CID, UTDOA and OTDOA. The purpose of the NRPPa protocol is to request measurement information from gNB, receive reports for eCID and UTDOA methods from gNB measurements and the needed configuration in the OTDOA method, which can be exemplified with the exchange information for the SRS/PRS bandwidth and desired configuration for UTDOA and OTDOA.

The importance of reliability for 5G positioning, and the constant requirements of location based services in many applications, the need for positioning information has increased from specific situations to a majority of the UEs in a modern communications network. The high number of use-cases with different requirements has led to several positioning solutions, based on both radio access technology, RAT, on UE capabilities. While GNSS based positioning has been the de-facto standard for many years, many other technologies are now available to draw positioning information from.

References are made to standard documents 3GPP, TS 36.355 LTE Positioning Protocol (LPP)-V15.1.0 (2018-09), 3GPP, TS 38.331 NR; Radio Resource Control (RRC)-V15.6.0 and 3GPP, TS 38.133 Requirements for support of radio resource management (RRM)-V16.0.0 for the understanding of terminology and the state of the art.

Publication US 2017/074989 A1 shows a positioning system for a mobile terminal with more than one sensor for positioning, where quality is measured depending on the situation.

Publication EP 2 534 902 A1 shows a positioning system where static circumstances, such as supported positioning technologies, are requested to determine positioning capabilities of a terminal.

SUMMARY OF THE INVENTION

With the many positioning options 5G will provide and the inhomogeneity of network members it will provide to, the decision on what technologies to choose in specific situations becomes harder. However, it is also desirable to find the solution that best meets the requirements of the use case.

For many use cases, especially ones with strict latency and transmission requirements, it is desirable to have a way to get a quality estimate in a compact way that does not include redundant information.

The situation the UE is in can change the expected quality of positioning methods, drastically in some cases, the standard needs to provide a basis for regular assessment of the expected quality.

Currently there is no mechanism deployed in the mobile communication standard that addresses the above described issues.

Previous standards relies on few or singular available technologies, however, the plurality of options available in 5G networks implies the need to make choices based on the reliability of technologies and requirements of the use cases. It is important that the positioning device, core network, and radio network provides a good basis for this kind of decisions.

Because 5G networks and modern UEs will provide many different positioning solutions, it is very important to communicate the reliability of the individual solutions. While the methods themselves are often an indicator of the expected quality, for many solutions, the quality within a method can vary greatly. Modelling the quality of the different information sources is a key component of information fusion systems, and therefore also of hybrid positioning systems. For example, high-cost Inertial Measurement Units, IMUs, can be used for positioning directly, while low-cost IMUs can only be employed in positioning in a reliable manner by using specific motion methods like step detection for pedestrians, or GNSS quality. Furthermore, many use-cases have strict latency or power consumption requirements which requires that the available positioning technologies can be evaluated from a cost vs. benefit point-of-view, so that only the minimum set of sensor data to meet the positioning requirements is transmitted. Likewise, it is also possible that only quality indicators derived from the sensor data are transmitted.

Three scenarios for the positioning procedure will result:
No feedback: QoS not relevant or single (or few) technologies are supported/desired by the network
Extensive Information: choosing and tracking everything causes drawbacks on the device power consumption and signalling resources
Optimum: The network provider uses available information from other sources and the specific UE to decide on the best positioning method for the UE in the current situation. The network requires specific signalling from the UE that can assist in this situation. This option avoids transmitting redundant information, and can help keeping latency, transmission or power consumption limitations The invention relates to a method for a network entity, NE, to optimize positioning of a user equipment, UE, where the reliability of positioning of a UE depend on static circumstances and situational/environmental circumstances, where static circumstances are the sensor capabilities, and sensor quality related to the UE, radio access network, RAN, capabilities, and general system limitations, where static circumstances remain the same regardless of the position of the UE, where situational/environmental circumstances depend on the situation or environment of the UE, where situational/environmental circumstances change with the position and/or other physical states of the UE.

The NE request a quality report from a measurement unit, MU, to enable the MU to report on quality changes due to situational or environmental circumstances to the NE, wherein the request indicates the positioning technologies used for quality reporting, wherein the NE informs the MU which sensors and technologies to monitor and request a report from these sensors and technologies, wherein the NE receives results from measurements performed by the MU, which measurements are performed by the MU with or without further network assistance, wherein in response to the request, the NE receives a message including the MU quality report in order to enable the NE to decide on the best positioning method for the UE in the current situation for the indicated sensors and technologies, and wherein the NE perform the position calculation.

It is proposed that the MU may be enabled to report static parameters to the NE, and wherein the static parameters are at least one of the following:
- at least one of the Receiver Antenna, Constellation, Frequency Bands for GNSS systems,
- at least UE sensor quality,
- at least gNB or LMU Sensor Quality,
- general system limitation(s),
- defined by the ID of each of the devices or quality estimates present in the UE, or
- static reliability derived from capability reporting from the UE.

It should be understood that the NE can be a location server, LS, or a location management function, LMF, and that MU can be a UE, a gNB or a location measurement unit, LMU.

The MU is enabled to use at least one of initial quality reporting, periodic quality reporting, or triggered quality reporting, for the quality reporting.

The initial quality reporting may comprise the steps of NE requesting initial measurements from MU, and MU providing the results of the initial measurements to NE, and where a step of NE providing assistance data to MU is performed before and/or after the steps of NE requesting initial measurements from MU, and MU providing the results of the initial measurements to NE.

It is proposed that the NE may use available information from other sources and from the MU to decide on the best positioning method for the UE in the current situation.

An expected time-of-stability of a transmitted quality report may be used to dictate the period for periodic quality reporting, or to trigger a triggered quality report.

The MU or the NE may initiate a triggered quality report depending on the current situation of the MU or NE, or a default setting in the MU may be used to initiate a triggered quality report.

It should be understood that the UE can trigger the report, or request the report, if the quality of the monitored measurement changes. Generally, the UE triggering criteria could be configured by the NE. One can also assume that the UE has default setting it can use for triggered reporting in case the NE does not provide instructions.

It is proposed that quality-related signalling is received by the NE from the MU to enable the NE to make a decision on optimal positioning technology, or that quality-related signalling is sent from the NE to the UE to enable the UE to make a decision on optimal positioning technology.

The NE may receive results from measurements performed by the MU, where these measurements are performed by the MU with or without further network assistance, and where the NE perform the position calculation, it is also possible, where the MU is a UE, that the network assistance enables the UE to perform sensor measurements and calculate its own position.

Regardless of if the NE or MU performs the position calculations, it is proposed that the NE informs the MU which sensors and technologies to monitor and request a report from these sensors and technologies.

It is also possible, where the MU is a UE, that the NE enables the UE to make a decision on optimal positioning technology, whereby the NE enables the UE to perform sensor measurements and calculate its own position.

A quality index may be used in the quality report which enables the MU to represent a quantized feedback on available sensors and technologies for positioning, in which case the NE may hold a table that specify certain technologies for positioning of the UE, where the quality index maps to a position in the table, which position represents the available quality of the signal for respective technology, and where the quality index gives an indication on which technologies that are possible to use without the transmission of a complete measurement.

In cases where there may be power consumption restrains on certain UEs, and where the MU is a UE, it is proposed that the NE may take the decision to instruct the UE to switch off an available sensor or technology temporarily, based on whether the sensor or technology is required for UEs constrained with power consumption.

It is possible to allow the NE to determine the situational/environmental circumstances of supported RATs by requesting the UE or gNB measurement reports from an NG-RAN over an NRPPa interface.

It is proposed that different events may be triggered by a triggering mechanism with threshold parameters defined as:
RI-1: RAT independent quality becomes higher than a threshold,
RI-2: RAT independent quality becomes lower than a threshold,
RD-1: RAT dependent quality becomes higher than a threshold,
RD-2: RAT dependent quality becomes lower than a threshold,
wherein triggering an entering condition is based on that a quality parameter becomes higher than RI-1 or RD-1, and triggering a leaving condition is based on that a quality parameter becomes lower than RI-2 or RD-2.

A quality parameter can be defined and estimated in different ways, and it is proposed that it may be based on a sum of:
the estimated quality of a measured parameter, and
the certainty of the estimated quality,
where the estimated quality may an integer in the range of "a" to "b", where "a" represent low estimated quality and "b" represent high estimated quality, where the certainty is an integer in the range of "c" to "d", where "c" represent low certainty and "d" represent high certainty, where a pre-defined value, which is an integer between "a+c" and "b+d" in a sum function, or a*c and b*d in a product function, defines the threshold parameter for when a mechanism is triggered, where a predefined value for each event is defined by the network, and where each predefined value is adapted to each event where one predefined value for one event does not have to be the same as another predefined value for another event.

Advantages

The advantages of a method to optimize the positioning procedure of a UE according to the present invention are that the method enables the possibility to track and reporting only a selected set of technologies for positioning, and where the correct set of technologies tracked then the positioning accuracy for a MU can be increased, the LPP message size can be reduced, and the power consumption of the UE can be reduced.

BRIEF DESCRIPTION OF THE DRAWINGS

A method according to the present invention will now be described in more detail with reference to the accompanying drawings, where:

FIG. 1 is a state of the art illustration of the LPP procedure,

FIG. 2 is an example of a state of the art LLP message body,

FIG. 3 is an example of a state of the art request for location information,

FIG. 6 is an example of a realization of a RequestLocationQuality and a ProvideLocationQuality message in LPP, FIG. 7 is an example realization of a OTDOA-ProvideLocationQuality message in LPP, FIGS. 8a, 8b and 8c are examples of a modified LPP procedure relating to the Provide assistance data, FIG. 9 is an example of a modified LPP message body, FIG. 10 is an example of a modified RequestLocationInformation in LPP, and FIG. 11 is an example of a modified ProvideLocationInformation in LPP.

DETAILED DESCRIPTION OF EMBODIMENTS AS PRESENTLY PREFERRED

The present invention will now be described in more detail and it should be understood that the invention is exemplified with specific embodiments according to different protocols or standards in order to show practical implementations of the invention where an LS or LMF is used in the role of the NE, and where a UE, a gNB or a location measurement unit, LMU is used in the role of the MU.

The invention proposes two kinds of circumstances or components of positioning quality that affect the reliability of positioning of a UE, which is static circumstances and situational or environmental circumstances.

Figure 4:
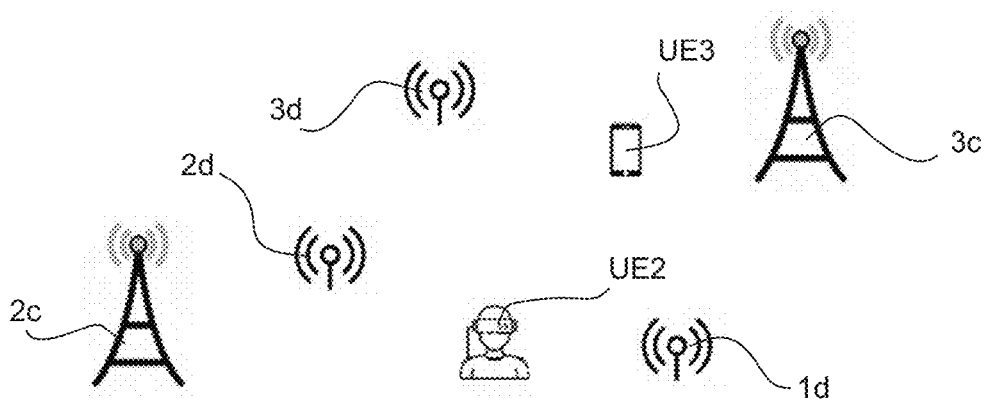
FIG. 4 is a schematic and simplified illustration of a location scenario.

FIG. 4 shows three different UEs, UE1, UE2, UE3, that have different positioning capabilities. Static component of the positioning quality of each positioning solution is the part that does not dependent on the environment and situation the UE, UE1, UE2, UE3, is placed in. It compromises things like the sensor quality and general system limitations, where UE1 is a an intelligent container, which does not have any positioning capabilities, UE2, a VR head module, which is well equipped with GNSS, barometer and IMU and has the capabilities to use RAT, such as RTT and TDOA, and enhanced cell ID. UE3 is a regular smartphone which relies only on RATs, such as TBS, OTDOA, DL-TDOA, multi-RTT, UTDOA, DL-AOD, UL-TDOA and enhanced cell ID for positioning.

For the DL based methods, like DL-AoD, OTDOA, DL-TDOA, Multi-RTT, eCID, and NR-CID, TBS, the UE acting as a measurement unit may determine the situational quality of each method on the received signals transmitted from a gNB using assistance data received from the positioning server, LS, LMF.

For the UL based methods, like UL-AoA, UL-TDOA, Multi-RTT, eCID, and NR-CID, one or more gNB acting as a measurement units may determine the situational quality of each method on the received signals transmitted from a UE using assistance data received from the location server, LS, LMF, if needed.

Multi-RTT, eCID, NR-CID can involve both the UE and the gNB as measurement units for the UL and DL reference signals. The table below serves as an example for the assistance data provided from LS to the MU.

| Assistance data that may be transferred from LMF/LS to MU | MU |
|---|---|
| Physical cell IDs (PCIs), global cell IDs (GCIs), and TRP IDs of candidate NR TRPs for measurement | UE |
| Timing relative to the serving (reference) TRP of candidate NR TRPs | UE |
| DL-PRS configuration of candidate NR TRPs | UE |
| SSB information of the TRPs (the time/frequency occupancy of SSBs) | UE |
| Spatial direction information (e.g. azimuth, elevation etc.) of the DL-PRS Resources of the TRPs served by the gNB | UE |
| Geographical coordinates of the TRPs served by the gNB (include a transmission reference location for each DL-PRS Resource ID, reference location for the transmitting antenna of the reference TRP, relative locations for transmitting antennas of other TRPs) | UE |
| SRS configuration | gNB |

The MU measures at least one RSRP measurement on the DL or UL PRSs and can make use of the information provided by the LS or internal sensors to estimate a situational quality value. The MU can optionally make use of the measured timing or direction of downlink or uplink signals.

| Measurement results that may be transferred from MU to the LMF | MU | Description |
|---|---|---|
| Quality for UL-AoA | gNB | Situational Quality for method UL-AoD measured at the gNB/TRP and reported to the LMF |
| Quality for UTDOA | gNB | Situational Quality for method UTDOA measured at the gNB/TRP and reported to the LMF |
| Quality for UL-TDOA | gNB | Situational Quality for method UL-TDOA measured at the gNB/TRP and reported to the LMF |

| Measurement results that may be transferred from MU to the LMF | MU | Description |
|---|---|---|
| Quality for eCID | gNB/UE | Situational Quality for method eCID measured at the gNB/TRP, UE or both and reported to the LMF |
| Quality for NR-CID | gNB/UE | Situational Quality for method NR-CID measured at the gNB/TRP, UE or both and reported to the LMF |
| Quality for multi-RTT | gNB/UE | Situational Quality for method multi-RTT measured at the gNB/TRP, UE or both and reported to the LMF |
| Quality for DL-AoD | UE | Situational Quality for method DL-AoD measured at the UE and reported to the LMF |
| Quality for DL-TDOA | UE | Situational Quality for method DL-TDOA measured at the UE and reported to the LMF |
| Quality for OTDOA | UE | Situational Quality for method OTDOA measured at the UE and reported to the LMF |
| Quality for TBS | UE | Situational Quality for method TBS measured at the UE and reported to the LMF |
| Timestamp of the Situational Quality | gNB/UE | Timestamp of the reported situational quality |

In one example for DL-AoD, where a similar procedure can be used for DL-TDOA, OTDOA or TBS, the NW can indicate the UE (MU) to determine a situational quality. In this case the NW may provide the UE with assistance data including the DL-PRS configuration. The NW can also indicted the DL-PRSs that belong to the same gNB as part of the assistance data which can be indicates as DL-PRS resources belonging to a set of resources within each gNB within one frequency layer. The UE determines the RSRP on one or more DL-PRS resources or DL-PRS resource sets. The UE determines then the situational quality for the DL-AoD based on the value of the measured RSRP, the number of detected DL-PRSs within a DL-PRS set.

In one example for UL-AoA, where a similar procedure can be used for UL-TDOA, or UTDOA, the NW can indicate the gNB (MU) to determine a situational quality. In this case the NW may provide the gNB with assistance if needed, where the serving gNB can know the UL-PRS configuration of a UE. The gNB may determine the RSRP on one or more UL-PRS resources or UL-PRS resource sets. The gNB determines then the situational quality for the UL-AoA based on the value of the measured RSRP, the number of detected UL-PRSs within a UL-PRS set. The NW can combine the situational quality measurements from the same UE from more than one gNB all acting as measurement units for an Uplink signal transmitted from the UE.

In one example for multi-RTT, where a similar procedure can be used for NR-CID, or eCID, the NW request the situational quality from the UE and/or the gNB both being measurement units in this scenario. If both the UE and the gNB are indicated to report a situational quality, the NW can determine a situational quality based on a combination of the quality reported by the UE and the gNB.

While the sensor quality related to the UE capabilities and the general system limitations are a key aspect of the reliability, the situation the UE is in also plays a key role. For example, depending on the environment GNSS positioning can range from very reliable in outdoor scenarios with clear visibility of a decent number of satellites (not shown in the figure) to very unreliable in indoor or densely populated urban environments. In other words, a high quality GNSS receiver will not provide any meaningful positioning estimate in the cellar of a building, where Wi-Fi based positioning might provide a decent positioning solution. Therefore, the inferior technology, from a sensor quality point-of-view, would be preferred in this case. Apart from the environment, the dynamics of the UE also play a key role in the positioning reliability for motion capturing sensors like IMU. Also, movement within the environment will drastically change the channel environment and therefore also the positioning capabilities based on e.g. TDOA.

To cover situational quality changes, multiple solutions are possible:

initial quality reporting, i.e. the relevant parameters are transmitted at the beginning of the localization task, periodic reporting, i.e. relevant parameters are transmitted regularly to enable supervision of potential changes in situational quality, triggered reporting, i.e. the change in quality is detected and triggers signalling, or any combinations of the above.

The quality measures, especially the situational ones, do change over time. Depending on the situation, this change can be sudden or over extended time periods. For example, the available constellation of satellites for a moving car on a highway will change in a matter of minutes, while the available base-stations for RAT localization will change quickly over time. It is therefore of interest to include an additional indicator for the proposed quality measurements, which specifies the expected time-of-stability of the transmitted quality measure.

The decision on the optimal set of positioning technologies is relevant to both the UE and/or the LS, depending on application and available resources to either. Therefore, it is proposed that protocol adjustments are made that enable both the LS and the UE to make informed decisions based on the quality of the available technology. This means that the protocol needs to enable quality-related signalling from the UE to the LS, UE-assisted, and vice versa, UE-based.

The quality of the individual positioning technologies can therefore be split into static, i.e. situation independent, and situational components. While the static measurements can easily be extracted from knowledge about the sensors, the situational components vary over time and require a precise assessment of the situation. The following table shows some of the possible dependencies for some positioning technologies supported by 5G. The main idea is that there is a set of indicators included for each of the technologies. The table serves as an example and does not limit the scope of the invention.

| Technology | Static Reliability | Situational Quality | Lifetime |
| --- | --- | --- | --- |
| GNSS | Receiver Antenna, Constellations, Frequency Bands, | Number of available Satellites, Propagation, Environment, DOP, | Medium, dependent on movement within environment |
| IMU | Sensor Quality, (IMU Grade) | Movement type | Long, independent of environment |
| OTDOA | UE Sensor Quality | DOP, Environment, | Medium, dependent on movement within environment |
| UTDOA | gNB or LMU Sensor Quality | DOP, Environment, | Medium, dependent on movement within environment |
| ... | | | |

An exemplary scenario is shown in FIG. 4, where three UEs, UE1, UE2 and UE3, with different RAT-dependent and independent positioning capabilities are shown. As mentioned before, the UE1 is an intelligent container, and does not have any positioning capabilities, UE2, is a VR head module, which is well equipped with GNSS, barometer and IMU and has the capabilities to use RAT, such as RTT and TDOA, and enhanced cell ID. UE3 is a regular smartphone which relies only on RATs, such as TDOA, RTT and enhanced cell ID, for positioning. In the figure there are central units, gNB-C, 1c, 2c, 3c, and distributed units, gNB-D, 1d, 2d, 3d.

While UE1 can only obtain and communicate a very rough estimate, e.g. by cell ID, of its position and only has this one option, the high number of options for UE2 results in many possibilities, RAT dependent/Independent, hybrid or singular.

To make an informed decision to obtain the best option for each use-case, the quality of each individual technology needs to be known. While the static reliability can be communicated on request, e.g. defined by the ID of each of the devices or quality estimates present in the UE, the situational quality has to be obtained in another way, especially for RATs.

Figure 5:
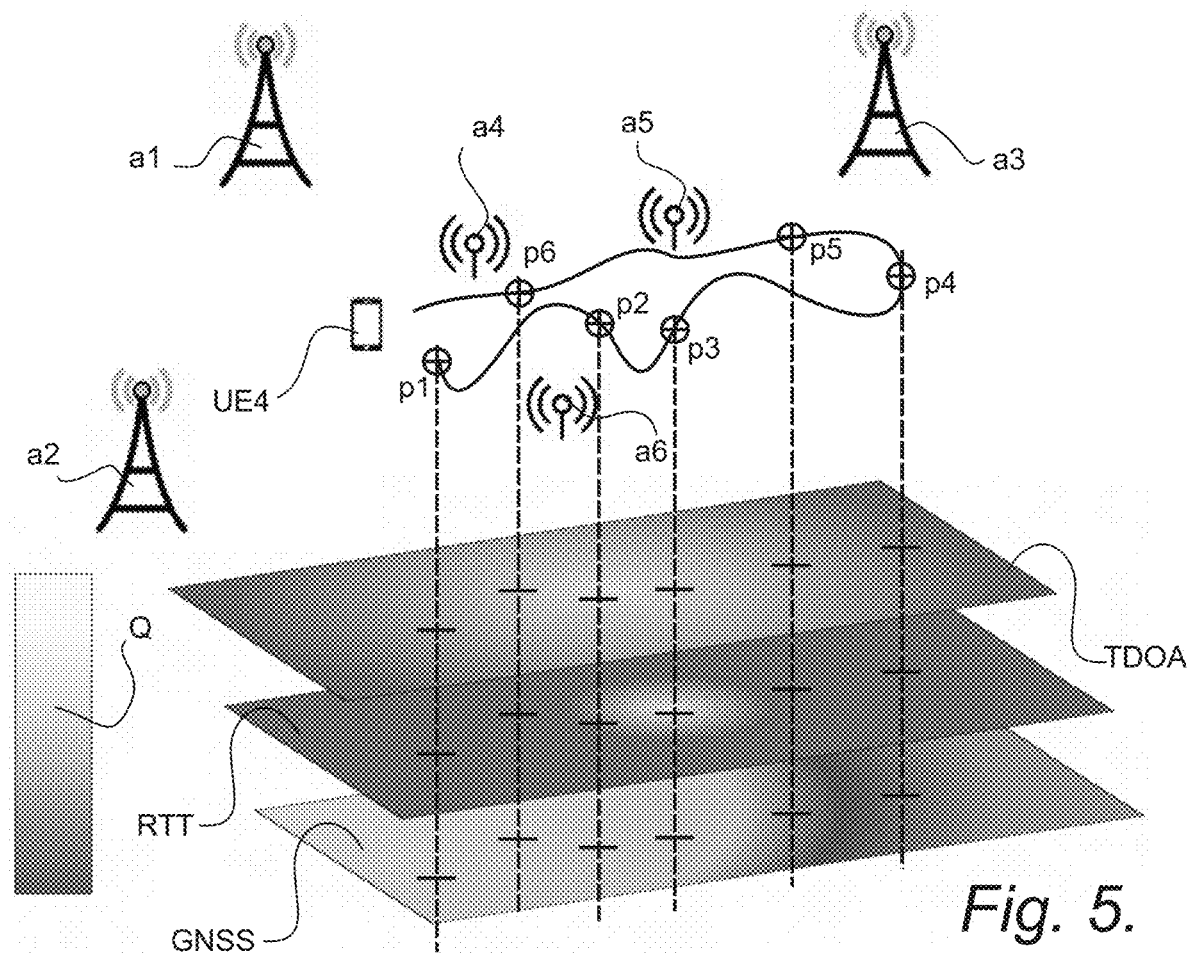
FIG. 5 is a schematic and simplified illustration of spatial distributions of the positioning reliability of different exemplifying technologies.

FIG. 5 illustrates this concept, where UE4 is moving through an environment where two different RATs, here exemplified by TDOA and RTT, and one non-RAT, here exemplified by GNSS, are available with different quality, Q, for UE4. In the figure high quality is light and low quality is dark. For methods like RTT or TDOA the position of the object in relation to anchors a1, a2, a3, a4, a5, a6, in FIG. 5 exemplified by three gNB-Cs, a1, a2, a3, and three gNB-Ds, a4, a5, a6. Satellites required for GNSS are not shown in the figure. The constellation of used anchors a1, a2, . . . , a6 implies the expected positioning accuracy from a purely geometric point-of-view. This is usually described by measures like the dilution-of-precision, DOP, and can be understood as a spatial distribution of reliability constraints so that the geometry will imply a decent positioning result on some positions and a bad one at other positions. For non-RATs, similar constraints exist, e.g. the number of visible satellites and their distribution in the sky for GNSS. Another situational impact is the environment. For instance, taking the UE4 trajectory in FIG. 5 as an example:

At the first position p1 the GNSS receiver of UE4 can be used to obtain a decent positioning result in a rural area or outside of buildings hence GNSS shows here a good quality. At a second position p2 the moving UE approaches an urban area with good deployment where TDOA becomes better and GNSS degrades gradually. At a third position p3 the UE approaches an area with very good RTT performance like an indoor building where TDOA performance degrades and GNSS is completely out. At a fourth position p4 no positioning method is available and TDOA appears back at a fifth position p5. At a sixth position p6 GNSS is back and available.

In this example the known LPP procedure will choose either GNSS or TDOA or both. At many of the instances one technology will be sufficient. At the third position p3 if RTT performance surpasses GNSS and TDOA then it is sufficient for the UE4 to perform the RTT measurements only.

The quality signalling can be used as measurement to optimize the deployment for positioning performance, like between the fourth p4 and fifth p5 positions. The UE will need to be triggered to report this information to the LS.

While the decision on the positioning scheme itself may be on the network provider or user of the protocol, it is important that there exists the ability to communicate relevant information, both static and situational, for the implementation of hybrid/sensor fusion based and the decision on the most appropriate singular positioning method.

Static reliability can be derived from Capability Reporting from the UE and/or RAN. This part of signalling is supported for all or most of the technologies in LPP.

Situational Quality is an event triggered reporting which depends on:
  an initial request upon a positioning request to identify the optimum choice of technologies, which could be done in the initial capability request stage, or
  a change in quality for the relevant technology or sensor information.

Three positioning modes are proposed that are supported in 3GPP, these modes define the information needed to be transferred from the target device to the network and vice versa. The three modes are UE-Assisted mode, UE-Based mode and Standalone mode.

In the UE-Assisted mode the UE performs measurements with or without assistance from the network and sends these measurements to the location server where the position calculation may take place.

Needed signalling is that the UE reports information over LPP.

As described above, reporting from the UE to a LMF is necessary if the UE receives a report request from the LMF or if the change in quality of one or more technologies triggers a report. The quality measures of each technology depend on several measurements, e.g. DOP or change of environment. To report these changes in quality, LPP has to support these messages. An example of a realization in LPP of a RequestLocationQuality and a ProvideLocationQuality message is shown in ASN.1 format in FIG. 6.

FIG. 7 shows an exemplary realization of a OTDOA-ProvideLocationQuality message in LPP in ASN.1 format, showing a representation of the discussed quality measures for OTDOA. Obviously, the impact on other technologies can be described in a similar manner.

It is proposed that the network can inform the MU which sensors and technologies to monitor and send a Report_request.

In the UE-Based mode the UE performs sensor measurements and calculates its own position, possibly with network assistance.

In this mode the network can inform the UE which sensors and technologies to monitor and send a Report_request.

In the standalone mode the UE calculates its own position without network assistance. In this mode optional or no signalling needed.

It is proposed that the UE reports information through the control plane, thus enabling:

- For devices constrained with power consumption, the device may have benefit in switching off a complementary technology temporarily even though a fusion would bring more precise results. For LMF to be able to take this decision without having complete measurement, it is proposed here to use quantized feedback on the possibilities, which will be exemplified later in the description.
- In addition, providing the complete measurement obtained from the GNSS signals and RAT-based NR measurements would be an extra overhead for feedback link, when the situational quality changes. Therefore, the UE only reports quantized feedback in the form of fusionQualityIndex, which maps to how many GNSS satellite and how many TPs could be used at the on configured quality level. The fusionQualityIndex directly maps to a row of the table and provides information on how many GNSS satellites and how many TPs are detected above a certain reliability threshold.

It is also proposed that the serving gNB information can be helpful for the decision on which technology or technologies that are optimal to localize the target UE, in which case:

- the information can be based from the UE Measurement Report based on the SSB measurements for the s-gNB and n-gNBs or the beam report.
- gNB measurements based on the UL Measurements made by the gNB, like SRS, can be forwarded to the LMF.

This enables that:
- LMF to request information available, example RRM reporting, at the s-gNB for the target UEs,
- LMF can request quality indication based on UL-RSs reports made at the gnB, or
- UEs with similar reporting can have similar indications, based on LMF data base.

The procedure for this can be:
1) The LMF receives QoS request from the LC (location client)
2) If the NG-RAN capabilities are not known:
   a) The LMF requests the supported NG-RAN techniques
   b) NG-RAN provides NG-RAN supported techniques
3) Decide on open-loop, not based on UE-specific report, or closed-loop, UE-specific
   a) Open Loop config (based on network information only, ex. RAN supports only OTDOA)
      i) In case of 3-a configure reporting settings (single, periodic, triggered reporting, or a combination of the before mentioned options)
   b) Closed Loop config
      i) In case of 3-b the LMF can request the "Measurements Characteristics" from the NG-RAN
         (1) Specific Positioning UE measurements from the serving gNB and neighbor gNB (Channel state information measured at the gNB from UL reference signals like SRS), and/or
         (2) UE measurement report (based on the procedure in TS 38.214 and TS 38.331)

It is proposed that RRC impact report triggering can be used where new events can be defined for the event triggering mechanism. For example these events can be:
RI-1 where RAT independent, RI, quality becomes higher than a threshold
  GNSS quality becomes lower than a threshold
  WLAN quality becomes lower than a threshold
RI-2 where RAT independent, RI, quality becomes lower than a threshold
  GNSS quality becomes higher than a threshold
  WLAN quality becomes higher than a threshold
RD-1 where RAT dependent, RD, quality becomes higher than a threshold
  OTDOA quality becomes lower than a threshold
  RTT quality becomes lower than a threshold
RD-2 where RAT dependent, RD, quality becomes lower than a threshold
  OTDOA quality becomes higher than a threshold
  RTT quality becomes higher than a threshold It is important to note that the event can also be expanded to be technology dependent (WLAN, GNSS, OTDOA, RTT . . . )

Triggering a reporting event can be performed by defining a triggering mechanism in RRC:
  RRC procedure quality becomes better than threshold (RD-1 or RI-1)
  The UE shall:
  1> consider the entering condition for this event to be satisfied when condition RD-1 or RI-1, as specified below, is fulfilled;
  1> consider the leaving condition for this event to be satisfied when condition RD-2 or RI-2, as specified below, is fulfilled;
  Inequality R1-1 (Entering condition)
  f(Quality,Certainty)>Thresh
  Inequality R1-2 (Leaving condition)
  f(Quality,Certainty)<Thresh
  The variables in the formula are defined as follows:
  Quality is the measurement result of the serving cell, not taking into account any offsets.
  Certainty is the certainty parameter for the estimated quality. And f(Quality,Certainty) is a function depending on the Quality and Certainty parameters.

A quality parameter can be defined and estimated in different ways, and it is proposed that it may be based on a sum or the product of:
  the estimated quality of a measured parameter, and
  the certainty of the estimated quality,
where the estimated quality may an integer in the range of "a" to "b", where "a" represent low estimated quality and "b" represent high estimated quality, where the certainty is an integer in the range of "c" to "d", where "c" represent low certainty and "d" represent high certainty, where a predefined value, which is an integer between "a+c" and "b+d" for a sum function or "a*c" and "b*d" for a product function, defines the threshold parameter for when a mechanism is triggered, where a predefined value for each event is defined by the network, and where each predefined value is adapted to each event where one predefined value for one event does not have to be the same as another predefined value for another event.

One simple implementation of these quality parameters is if "a"="c"=0 and "b"="d"=50, which would mean that "a"+"c"=50 and "b"+"d"=100.

It is proposed that initial UE measurements are used to determine the needed measurements.

The same triggering procedure can be applied by high layer signalling like LPP, LPPe or other higher layer signalling The LS may decide for technology in step 4 in FIG. 1 (introduce steps in the figure!) without necessarily collecting the UE information which could be critical for the performance of certain technologies. For example, TDOA requires at least 3 base stations to estimate the UE position, if the UE cannot receive the synchronization signals from the neighbour gNBs, n-gNBs, or if the RSRP/SINR for the serving gNB is so low so that its un-probable that the positioning reference signals, PRS, for n-gNBs can be acquired, then requesting TDOA from the UE will result in waste of resources, extra latency and UE power consumption.

For Hybrid solutions, whether RAT dependent, RAT-independent or combined, it is more efficient that the LS identifies first which measurements are useful based on the reported initial measurements or other relevant quality indicators as described above. Examples:

One example is that if the UE reports that the links to gNB1 and gNB2 are received with a good quality, gNB3 and gNB4 are received but with bad quality, i.e. not optimal for TOA/DOA estimation, the LMF may request the direction of arrival and/or direction of departure and/or RTT or RSTD or TOA or other channel measurements from the gNB1 and gNB2 solely.

Another example is that if the UE reports that the links to gNB1, gNB2, gNB3 and gNB4 are received but with good quality, the LMF may request to perform RTT or otdoa-RequestLocationInformation or utdoa-RequestLocationInformation from the 4 gNBs, in which case configuration of bandwidth or periodicity may be RE based on initial measurements.

Another example is that if the UE reports that the links to gNB1, gNB2, gNB3 and gNB4 are received but with bad quality, the LMF may decide for RAT reporting for the gNB links, beam IDs, RSRP and/or SNIR and apply fingerprinting or state of the art RSSI positioning based approaches.

Another example is that the UE may also report information of RAT-independent technologies like GNSS or/and WiFi.

For devices constrained with power consumption, the device may benefit from switching off a complementary technology temporarily even though a fusion would bring more precise results. For E-SMLC to be able to take this decision without having complete measurement, it is proposed here to use quantized feedback on the possibilities.

In addition, providing the complete measurement obtained from the GNSS signals and RAT-based NR measurements would be an extra overhead for the feedback link when the situational quality changes. Therefore, the UE only reports quantized feedback, here called "QualityIndex", which maps to how many GNSS satellite and how many TPs could be used at the on configured quality level. The QualityIndex directly maps to a row of the table and provides information on how many GNSS satellites and how many TPs are detected above a certain reliability threshold.

| QualityIndex | Number of usable GNSS satellites at configured qualityThreshold | Number of reliable TPs detected at configured qualityThreshold |
|---|---|---|
| 0 | 0 | 0 |
| 1 |  | 1 |
| 2 |  | 2 |
| 3 |  | 3 or more |
| 4 | 1 | 0 |
| 5 |  | 1 |
| 6 |  | 2 |
| 7 |  | 3 or more |
| 8 | 2 | 0 |
| 9 |  | 1 |
| 10 |  | 2 |
| 11 |  | 3 or more |
| 12 | 3 | 0 |
| 13 |  | 1 |
| 14 |  | 2 |
| 15 |  | 3 or more |
| 16 |  | 0 |
| 17 | 4 or more | 1 |
| 18 |  | 2 |
| 19 |  | 3 or more |

The table may be reported for the configured qualityThreshold or a set of them or the UE could report the best qualityThreshold that the UE could support. The quality threshold would have a value from 0 to 1, and would be uniquely interpreted by both UE and the E-SMLC regarding the quality of link it describes.

After the feedback, the E-SMLC could command the UE to report on an index lower than the one the UE already reported. For example, if a QualityIndex of 19 is reported, the E-SMLC could choose only to use GNSS or TDoA measurements and therefore configure the UE to make further measurements either QualityIndex 16 for GNSS only or QualityIndex 3 for RAT based only.

Although the table above is illustrated for GNSS+NR, but it is clear that similar tables could be generated for other complementary technologies. By specifying the table, and the column of the table, the UE can give feedback on which technologies are possible without transmitting the complete measurements.

FIG. 8 shows a modified LPP procedure, where FIG. 8*a* shows that Provide assistance data can be performed before providing or requesting initial measurements, FIG. 8*b* shows that Provide assistance data can be performed after providing or requesting initial measurements, and FIG. 8*c* shows that Provide assistance data can be performed before and after providing or requesting initial measurements. The LMF can decide the requested information, step 6, based on the initial measurements and/or the positioning service level, accuracy, latency or other requirements, and/or UE capabilities for the positioning measurement set or technology to perform.

FIG. 9 illustrates a modified LPP message body, where it is shown that alternatively, without modifying the basic LPP procedure in FIG. 8, it is possible to enable Initial Measurements respectively event triggered quality reporting by enhancing the requestLocationInformation element respectively the provideLocationInformation element as shown in FIG. 10 and FIG. 11, where FIG. 10 illustrates a modified RequestLocationInformation in LPP and FIG. 11 illustrates a modified ProvideLocationInformation in LPP.

A proposed way of managing initial UE measurements information will now be described.

A request for Initial Measurements may be done by allowing the LMF to request following measurements, based on the UE capabilities and/or serving BS information and/or environment knowledge, such as supported technologies in the area, availability of fingerprint maps etc.

Provided Initial Measurements can include information according to section 9 in 3GPP, TS 38.133 RRM, which can be:
- Information on reception from serving gNBs, such as SSB beamID X, SNIR, RSRP,
- Information on reception from neighbouring gNBs: such as number of SSB beamID X, SNIR, RSRP,
- Information on channel quality for the serving and neighbour gNBs,
- Information on RAT independent quality of measurements if available at UE (GNSS, WLAN or BT)

It will be understood that that the invention is not restricted to the aforedescribed and illustrated exemplifying embodiments thereof and that modifications can be made within the scope of the invention as defined by the accompanying Claims.

The invention claimed is:

1. A method for a network entity (NE) to optimize positioning of a user equipment (UE) (UE1, UE2, UE3), where the reliability of positioning of a UE depends on static circumstances and situational/environmental circumstances, where static circumstances are the sensor capabilities and sensor quality related to the UE (UE1, UE2, UE3), radio access network (RAN) capabilities, and general system limitations, where static circumstances remain the same regardless of the position of the UE, where situational/environmental circumstances depend on the situation or environment of the UE, where situational/environmental circumstances change with the position and/or other physical states of the UE, wherein the NE request a quality report from a measurement unit (MU) to enable the MU to report on quality changes due to situational or environmental circumstances to the NE, wherein the request indicates the positioning technologies used for quality reporting, wherein the NE informs the MU which sensors and technologies to monitor and request a report from these sensors and technologies, wherein the NE receives results from measurements performed by the MU, which measurements are performed by the MU with or without further network assistance, wherein in response to the NE request, the NE receives a message including the MU quality report in order to enable the NE to decide on the best positioning method for the UE in the current situation for the indicated sensors and technologies, and wherein the NE perform the position calculation;
wherein events are triggered by a triggering mechanism with threshold parameters defined as:
RI-1: RAT independent quality becomes higher than a threshold,
RI-2: RAT independent quality becomes lower than a threshold,
RD-1: RAT dependent quality becomes higher than a threshold,
RD-2: RAT dependent quality becomes lower than a threshold,
wherein triggering an entering condition is based on that a quality parameter becomes higher than RI-1 or RD-1, and/or triggering a leaving condition is based on that a quality parameter becomes lower than RI-2 or RD-2.

2. The method of claim 1, wherein the MU is enabled to use at least one of:
initial quality reporting;
periodic quality reporting, or
triggered quality reporting,
for the quality reporting.

3. The method of claim 2, wherein the initial quality reporting comprises the steps of NE requesting initial measurements from MU, and MU providing the results of the initial measurements to NE, and where a step of NE providing assistance data to MU is performed before and/or after the steps of NE requesting initial measurements from MU.

4. The method of claim 2, wherein an expected time-of-stability of a transmitted quality report is used to dictate the period for periodic quality reporting, or to trigger a triggered quality report.

5. The method of claim 2, wherein the MU or the NE initiates a triggered quality report depending on the current situation of the MU or NE.

6. The method of claim 1, wherein quality-related signaling is received by the NE from the MU to enable the NE to make a decision on optimal positioning technology.

7. The method of claim 1, where the MU is a UE, and wherein the NE takes the decision to instruct the UE to switch off an available sensor or technology temporarily, based on whether the sensor or technology is required for UEs constrained with power consumption.

8. The method of claim 1, wherein the NE determines the situational/environmental circumstances of supported Radio Access Technologies (RATs) by requesting the UE or gNB measurement reports from an NG-RAN over an NRPPa interface.

9. The method of claim 1, wherein a quality parameter is based on a sum of:
the estimated quality of a measured parameter, and
the certainty of the estimated quality,
wherein the estimated quality is an integer in the range of a to b, where a represent low estimated quality and b represent high estimated quality, where the certainty is an integer in the range of c to d, where c represent low certainty and d represent high certainty, where a predefined value, which is an integer between a+c and b+d in a sum function, or a*c and b*d in a product function, defines the threshold parameter for when a mechanism is triggered, where a predefined value for each event is defined by the network, and where each predefined value is adapted to each event where one predefined value for one event does not have to be the same as another predefined value for another event.

10. The method of claim 1, where the NE is a location server (LS) or a location management function (LMF).

11. The method of claim 1, wherein the MU is a UE, a gNB or a location measurement unit (LMU).

12. A network entity (NE) adapted to optimize positioning of a user equipment (UE) (UE1, UE2, UE3), where the reliability of positioning of a UE depend on static circumstances and situational/environmental circumstances, where static circumstances are the sensor capabilities and sensor quality related to the UE (UE1, UE2, UE3), radio access network (RAN) capabilities, and general system limitations, where static circumstances remain the same regardless of the position of the UE, where situational/environmental circumstances depend on the situation or environment of the UE, where situational/environmental circumstances change with the position and/or other physical states of the UE, wherein the NE is adapted to request a quality report from a measurement unit (MU) to enable the MU to report on quality changes due to situational or environmental circumstances to the NE, wherein the NE is adapted to indicate the positioning technologies used for quality reporting in the request, wherein the NE is adapted to inform the MU which sensors and technologies to monitor and request a report from these sensors and technologies, wherein the NE is adapted to receive results from measurements performed by the MU, wherein, in response to the NE request, the NE is adapted to receive a message including the MU quality report in order to enable the NE to decide on the best positioning method for the UE in the current situation for the indicated sensors and technologies, and wherein the NE is adapted to perform the position calculation;

wherein events are triggered by a triggering mechanism with threshold parameters defined as:

RI-1: RAT independent quality becomes higher than a threshold,

RI-2: RAT independent quality becomes lower than a threshold,

RD-1: RAT dependent quality becomes higher than a threshold,

RD-2: RAT dependent quality becomes lower than a threshold, wherein triggering an entering condition is based on that a quality parameter becomes higher than RI-1 or RD-1, and/or triggering a leaving condition is based on that a quality parameter becomes lower than RI-2 or RD-2.

13. The NE of claim 12, wherein the NE is adapted to send quality-related signaling to the UE to enable the UE to make a decision on optimal positioning technology.

14. A measurement unit (MU) adapted to aid a network entity (NE) in optimizing positioning of a user equipment (UE) (UE1, UE2, UE3), where the reliability of positioning of a UE depend on static circumstances and situational/environmental circumstances, where static circumstances are the sensor capabilities and sensor quality related to the UE (UE1, UE2, UE3), radio access network (RAN) capabilities, and general system limitations, where static circumstances remain the same regardless of the position of the UE, where situational/environmental circumstances depend on the situation or environment of the UE, where situational/environmental circumstances change with the position and/or other physical states of the UE, wherein the MU is adapted to receive a request of a quality report from the NE, wherein the MU is adapted to report on quality changes due to situational or environmental circumstances to the NE, where the positioning technologies used for quality reporting is indicated in the request, wherein the MU is adapted to receive information on which sensors and technologies to monitor from the NE and to request a report from these sensors and technologies, wherein the MU is adapted to perform the measurements with or without further network assistance, wherein the MU is adapted to send results from measurements performed by the MU to the NE, wherein the MU is adapted to send a message including the MU quality report in response to the NE request;

wherein events are triggered by a triggering mechanism with threshold parameters defined as:

RI-1: RAT independent quality becomes higher than a threshold,

RI-2: RAT independent quality becomes lower than a threshold,

RD-1: RAT dependent quality becomes higher than a threshold,

RD-2: RAT dependent quality becomes lower than a threshold, wherein triggering an entering condition is based on that a quality parameter becomes higher than RI-1 or RD-1, and/or triggering a leaving condition is based on that a quality parameter becomes lower than RI-2 or RD-2.

15. The MU of claim 14, where the MU is a UE, and wherein the UE is enabled by the NE to make a decision on optimal positioning technology, whereby the UE is adapted to perform sensor measurements and calculate its own position.

* * * * *